United States Patent [19]
Johnson

[11] 4,109,679
[45] * Aug. 29, 1978

[54] CONTROLLER FOR FLUID PRESSURE OPERATED DEVICES

[75] Inventor: Oliver Wendell Johnson, Chaska, Minn.

[73] Assignee: Eaton Corporation, Cleveland, Ohio

[*] Notice: The portion of the term of this patent subsequent to Jul. 5, 1994, has been disclaimed.

[21] Appl. No.: 761,832

[22] Filed: Jan. 24, 1977

Related U.S. Application Data

[63] Continuation-in-part of Ser. No. 679,607, Apr. 23, 1976, Pat. No. 4,033,377, which is a continuation of Ser. No. 507,015, Sep. 18, 1974, abandoned.

[51] Int. Cl.² .............................................. B62D 5/08
[52] U.S. Cl. ........................... 137/596.13; 60/384; 91/467; 180/132; 137/596; 137/625.24
[58] Field of Search ........................... 60/384; 91/467; 180/132; 137/596, 596.13, 625.24; 418/61 B

[56] References Cited

U.S. PATENT DOCUMENTS

| | | | |
|---|---|---|---|
| 3,819,307 | 6/1974 | Uppal | 137/625.24 X |
| 3,960,234 | 6/1976 | Morgan | 180/132 |
| 4,033,377 | 7/1977 | Johnson | 137/596 |

*Primary Examiner*—Gerald A. Michalsky
*Attorney, Agent, or Firm*—L. Kasper

[57] ABSTRACT

A controller for fluid pressure operated devices such as power steering systems. The controller is of the type having a primary, rotatable valve member and a follow-up valve member and including a fluid meter having a metering member coupled to the follow-up valve member. The valving defines a central reference plane perpendicular to the axis of rotation of the valving, the primary valve member defining a pair of meter grooves oppositely and equally disposed about the plane. The follow-up valve defines pressure porting adjacent the plane and connected to the fluid inlet port. The primary valve member defines a pressure passage communicating with one of the meter grooves and extending a sufficient distance to communicate with the pressure porting for relative displacement of the valve members in one direction and another pressure passage communicating with the other meter groove and extending a sufficient distance to communicate with the pressure porting when the valve members are relatively displaced in the opposite direction.

18 Claims, 16 Drawing Figures

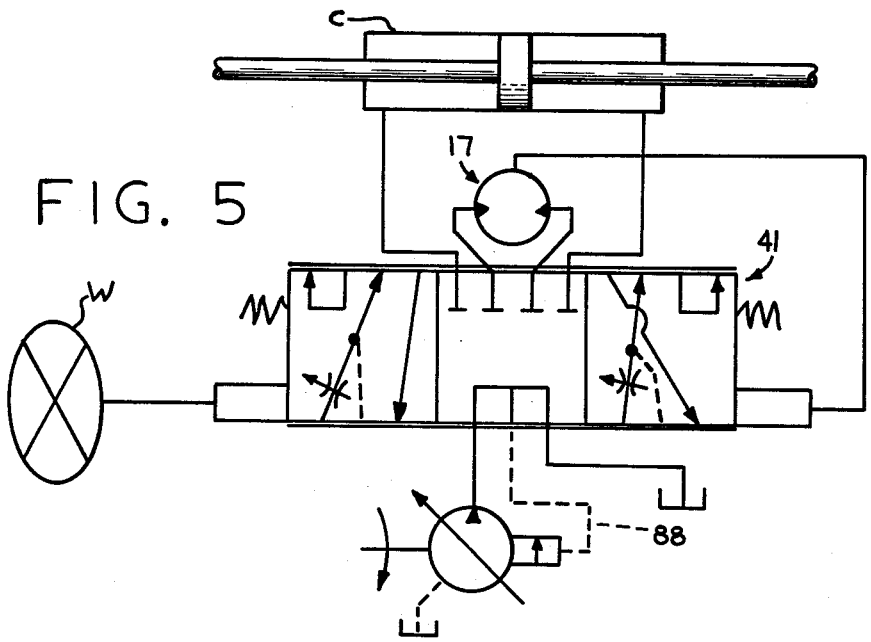
FIG. 5
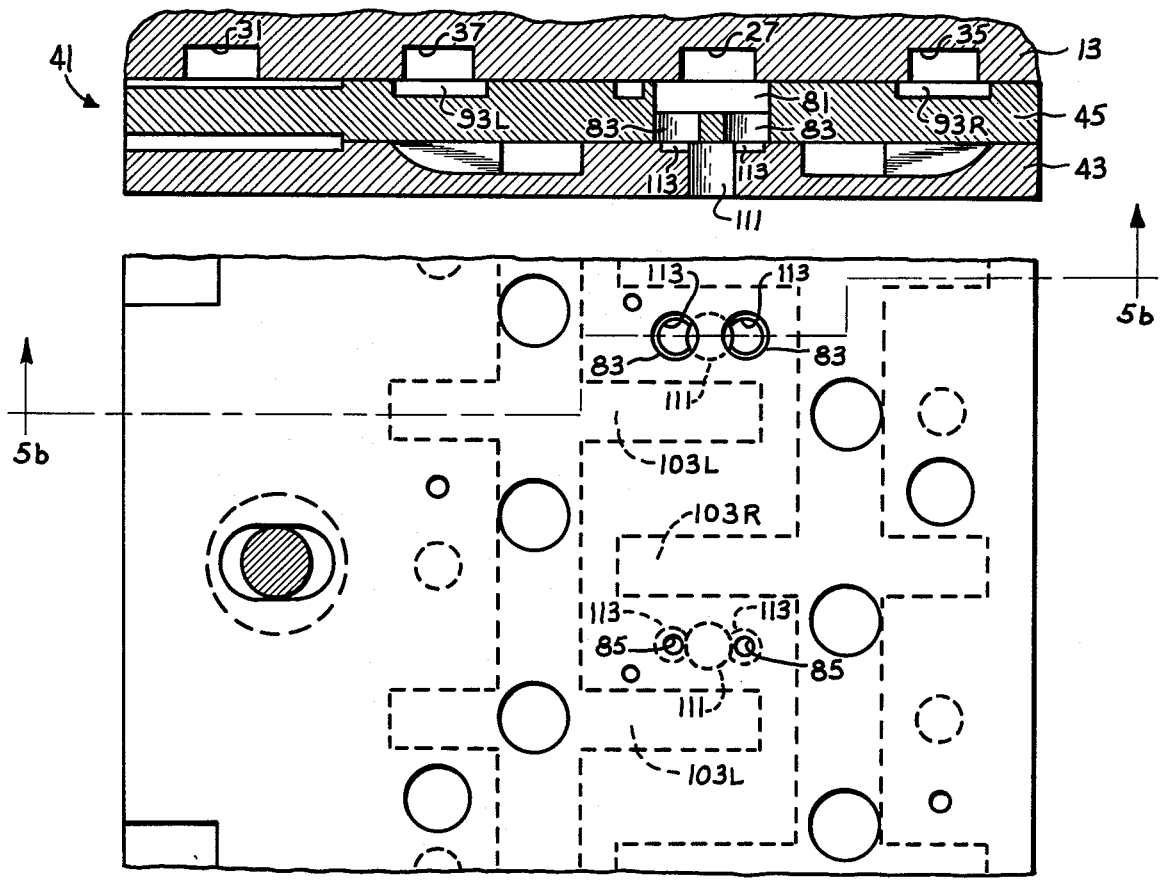
FIG. 5b
FIG. 5a

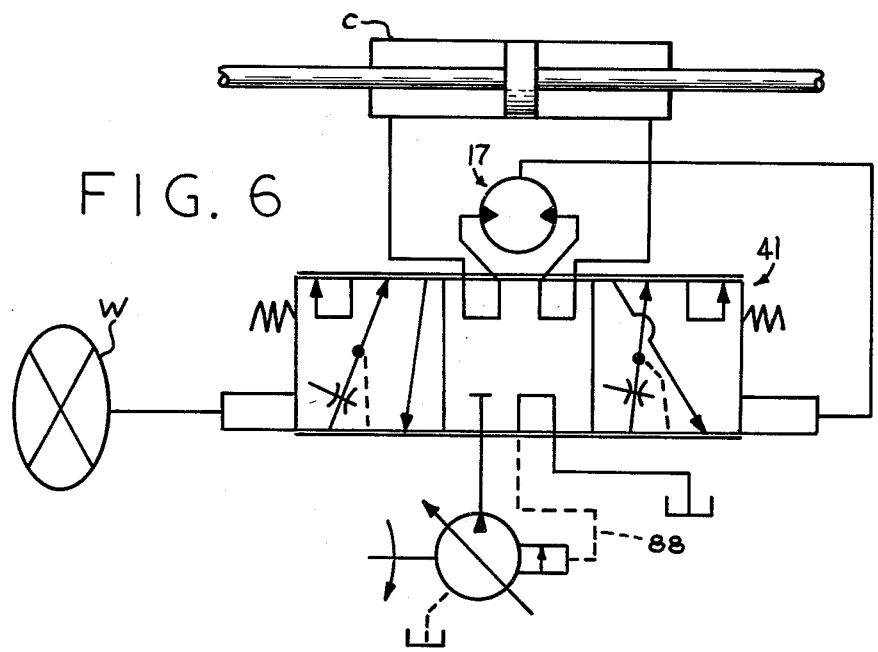
FIG. 6
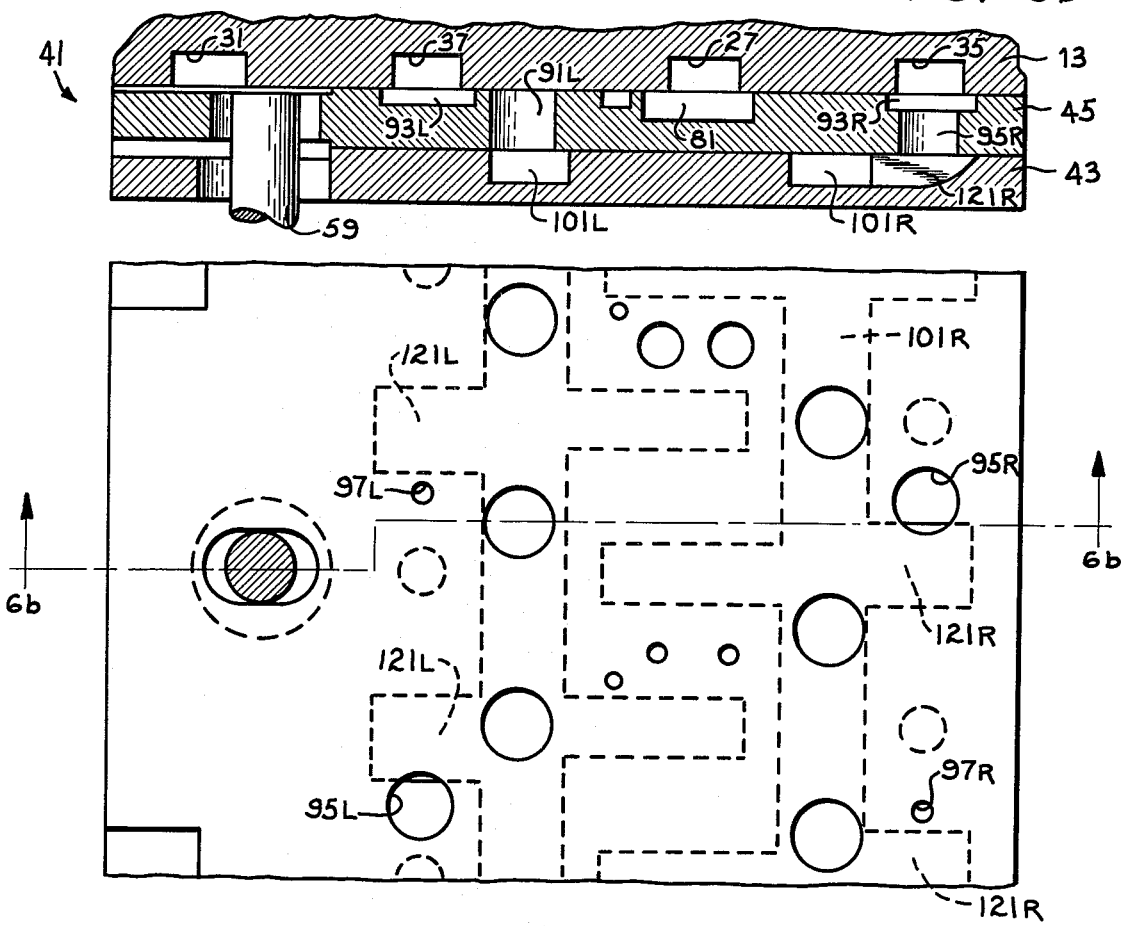
FIG. 6b
FIG. 6a

CONTROLLER FOR FLUID PRESSURE OPERATED DEVICES

CROSS REFERENCE TO RELATED APPLICATIONS

This application is a continuation-in-part of U.S. Application Ser. No. 679,607, filed Apr. 23, 1976 now U.S. Pat. No. 4,033,377, which is a continuation of U.S. Application Ser. No. 507,015, filed Sept. 18, 1974, now abandoned.

BACKGROUND OF THE DISCLOSURE

The present invention relates to a controller for fluid operated pressure devices, and more particularly, to a controller having an improved spool-sleeve valve configuration.

Although the present invention is equally adapted to any controller for fluid pressure operated devices wherein the controller utilizes a spool-sleeve valve arrangement, it is especially advantageous when used in controllers for power steering systems of the type employed in off-the-road vehicles, and will be described in connection therewith. Furthermore, although the invention will be described in connection with a rotatable spool-sleeve valve arrangement, it should be appreciated that the invention may also be utilized in spool-sleeve valve arrangements which operate in response to relative axial movement.

A controller for a power steering system of the type to which the present invention pertains is described in U.S. Reissue Patent No. 25,126, assigned to the assignee of the present invention. Controllers of the type disclosed in the cited reissue patent have become well known in the art and generally comprise a housing having an inlet and an outlet and a pair of control fluid ports, feeding a power steering cylinder. The vehicle steering wheel is directly connected to the controller and when in the neutral (non-rotating) position, fluid may pass from the inlet through the valve to the outlet (open-center system), or fluid from the inlet may be blocked from passing through the valve (closed center system).

When the steering wheel is rotated in one direction from the neutral position, the valve is displaced and fluid flows from the inlet through the valve, to the meter, then to one of the control fluid ports to move the power steering cylinder. When the steering wheel is rotated in the opposite direction, the valve rotates in the opposite direction and fluid flows from the inlet port through the valve, then through the fluid meter in the opposite direction, then to the other of the control fluid ports to move the power steering cylinder in the opposite direction.

One of the problems associated with the conventional power steering systems and the controllers used therein is steerine wheel "precession", i.e., the position of the steering wheel corresponding to the neutral position of the controller "precesses" or moves slowly in one direction or the other during operation of the system. it is believed that this is caused primarily by imbalance in the fluid flow paths, i.e., the fluid is subjected to a longer path and/or more flow restriction for one direction of steering than for the other. Among the other problems associated with systems and controllers of the type described is internal leakage, primarily between "metered" fluid and "return" fluid. As used herein, the term "metered" fluid refers to a fluid which has been measured by the fluid meter and is then fed to the power steering cylinder. The term "return" fluid refers simply to fluid displaced by the movement of the power steering cylinder which returns to the valve and passes to the outlet port (or tank port). While the above definitions are strictly true only for a controller in which the flow order is: inlet port — fluid meter — cylinder — outlet port, it will be apparent that the invention is equally adapted for controllers having other flow orders, including but not limited to: inlet port — cylinder — fluid meter — outlet port. In connection with the definitions of "metered" and "return" fluids for any particular controller, it should be noted that the remainder of the fluid passing through the spool-sleeve valve is at approximately the same pressure as the "metered" fluid, but has not been metered and hence, may be referred to as "high pressure, non-metered" fluid.

SUMMARY OF THE INVENTION

Accordingly, it is an object of the present invention to provide a controller for fluid pressure operated devices and a valving arrangement therefor which overcomes the above-mentioned problems.

It is a more specific object of the present invention to provide a controller and valving arrangement having a substantially symmetrical fluid flow path for either direction of operation of the valving.

It is another object of the present invention to provide a valving configuration for such a controller which achieves the above-stated objects and at the same time has a minimum axial length.

It is still another object of the present invention to provide valving for a controller which readily accommodates any desired combination of features such as closed-center or open-center; non-reaction or load reaction; lower flow capacity or higher flow capacity.

The above and other objects of the present invention are accomplished by the provision of an improved controller for fluid pressure operated devices. The controller comprises a housing, valve means including primary and follow-up valve members and means coupling the valve members for limited movement relative to a neutral position. The fluid meter includes a metering member and means is provided coupling the metering member to the follow-up valve member. The controller includes an inlet port, an outlet port, and first and second control fluid ports. The primary and follow-up valve members cooperate with the housing to define a first plurality of fluid passages connecting the inlet port in fluid communication with the first control fluid port through the fluid meter when the valve members are relatively displaced in one direction from neutral, and a second plurality of fluid passages connecting the inlet port in fluid communication with the second control fluid port through the fluid meter when the valve members are relatively displaced in the other direction from neutral. The first and second pluralities of fluid passages are arranged to provide substantially the same restriction to fluid flow in either direction of displacement of the valve members from neutral. The first and second pluralities of fluid passages include pressure port means defined by the follow-up valve and first and second meter grooves and first and second axial pressure passages defined by the primary valve member. The pressure port means is disposed adjacent the reference plane and the first and second meter grooves are oppositely and approximately equally disposed about the reference plane. The first axial pressure passage communicates with the first meter groove and extends a sufficient distance to communicate with the pressure port means when the valve members are displaced in one direction. The second axial pressure passage communicates with the second meter groove and extends a sufficient distance to communicate with the pressure port means when the valve members are relatively displaced in the other direction.

BRIEF DESCRIPTION OF THE DRAWINGS

FIG. 4b is a cross section taken on line 4b—4b of FIG. 4a.

FIGS. 5, 5a, and 5b are views similar to FIGS. 4, 4a, and 4b, respectively, illustrating the open-center embodiment of the present invention.

FIGS. 6, 6a, and 6b are views similar to FIGS. 4, 4a, and 4b, respectively, illustrating a load reaction embodiment of the present invention.

DESCRIPTION OF THE PREFERRED EMBODIMENT

Figure 1:
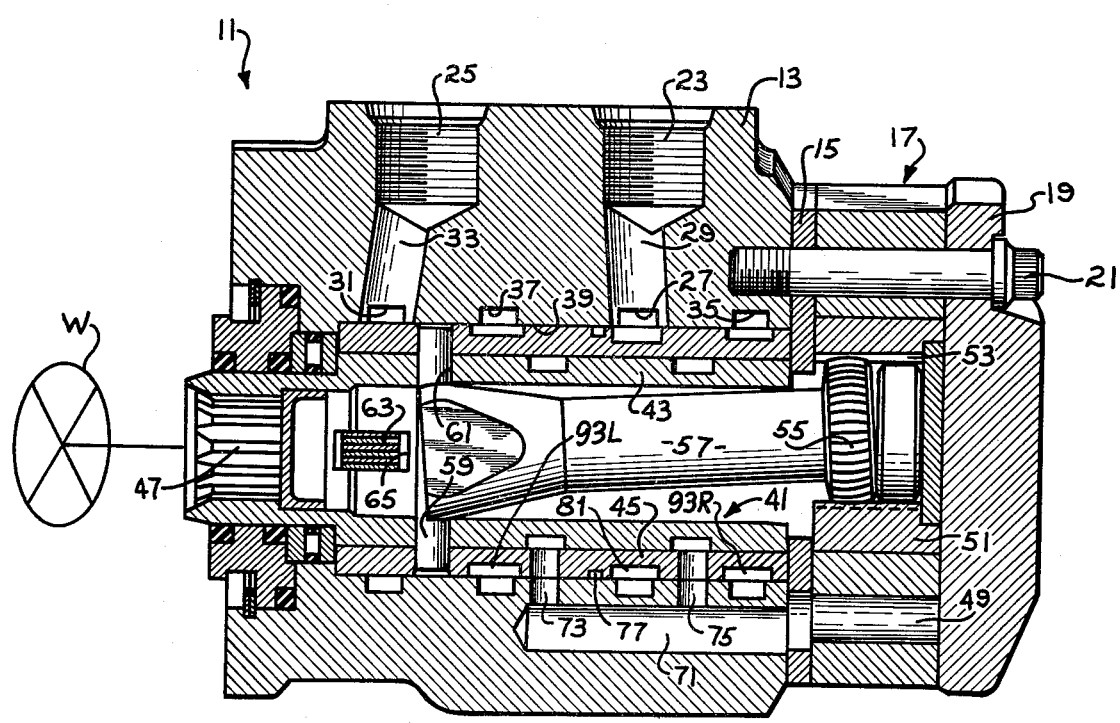
FIG. 1 is an axial cross section of a controller of the type adapted to utilize the present invention.

Referring now to the drawings, which are not intended to limit the present invention, FIG. 1 illustrates a controller generally designated 11, of the type with which the present invention may be utilized. The controller 11 is, in the subject embodiment, a steering control valve which will be described only briefly herein, but may be seen in greater detail, and its operation better understood by reference to U.S. Pat. No. 3,819,307, assigned to the assignee of the present invention.

Figure 4:
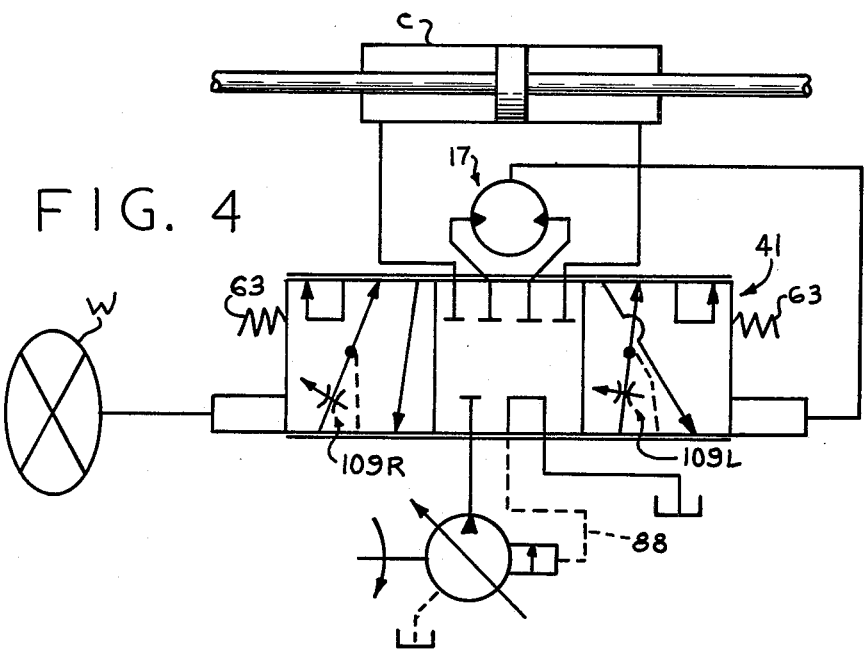
FIG. 4 is hydraulic schematic of a circuit including the controller of the present invention.

The steering control valve 11 is comprised of several sections including a housing 13, a port plate 15, a fluid meter 17, and an end plate 19. These sections are held together in tight sealing engagement by means of a plurality of bolts 21, in threaded engagement with the housing 13. The housing 13 defines a fluid inlet port 23, a fluid return port 25, and a pair of control fluid ports (not shown in FIG. 1) which, as is shown in FIGS. 4, 5, and 6, are connected to opposite ends of a steering cylinder C.

The controller housing 13 defines an annular groove 27 communicating with the fluid inlet port 23 through a fluid passage 29 and an annular groove 31 communicating with the fluid return port 25 through a fluid passage 33. Also defined by the housing 13 is a pair of annular grooves 35 and 37 communicating with the control fluid ports (not shown) through a pair of control fluid passages (also not shown) as is well known in the art.

Rotatably disposed within a valve bore 39 defined by the housing 13 is a controller valving, generally designated 41, and comprising a primary, rotatable valve member (spool) 43 and a cooperating, relatively rotatable follow-up valve member (sleeve) 45. At the forward end of the spool 43 is a portion having a reduced diameter and defining a set of internal splines 47 which provide for a direct mechanical connection between the spool 43 and a steering wheel W. The spool 43 and sleeve 45 will be described in greater detail subsequently.

The fluid meter 17, in the subject embodiment, comprises a gerotor gear set including an internally-toothed stator 49 and an externally-toothed rotor 51. The rotor 51 defines a set of internal splines 53, and in splined engagement therewith is a set of external splines 55 formed on the rearward end of a drive shaft 57, the shaft 57 having a bifurcated forward end permitting a driving connection between the shaft 57 and the spool 43 by means of a pin 59 passing through a pair of circumferentially-elongated pin openings 61 in the spool 43. Thus, pressurized fluid flowing through the valving 41 in response to a turning of the spool 43 by the steering wheel W flows to the fluid meter 17 causing orbital and rotational movement of the rotor 51 within the stator 49. Such movement of the rotor 51 causes follow-up movement of the sleeve 45 by means of the drive shaft 57 and pin 59 to maintain an appropriate relative displacement between the spool 43 and sleeve 45, corresponding to a particular rate of rotation of the steering wheel W. A plurality of leaf springs 63, extending through spring openings 65 in the spool 43, and spring openings 67 in the sleeve 45, urges the sleeve 45 toward the neutral position, relative to the spool 43.

The controller housing 13 defines a plurality of axially-extending bores 71, each of which communicates through an opening in the port plate 15 with one of the expanding or contracting volume chambers defined by the toothed interaction of the stator 49 and rotor 51. Communicating between each of the axial bores 71 and the valve bore 39 is a pair of meter passages 73 and 75, which function in association with the valving 41 in a manner to be described subsequently.

In connection with the subsequent description of the spool and sleeve in FIGS. 2, 3, 4, 5, 6, and 7, it should be noted that many of the ports, passages, etc. are arranged oppositely with respect to a central reference plane RP. Therefore, such elements will be described by a reference numeral followed by either an R or an L to indicate that the element is located on the right side or the left side, respectively, of the central reference plane RP. On the other hand, certain of the elements do not have a corresponding element oppositely disposed about the reference plane RP and will be referred to by use of a reference numeral alone. Furthermore, it should be understood that the overlaying views of FIGS. 4a, 5a, 6a, and 7a are intended to illustrate the interface between the valve spool 43 and the valve sleeve 45 and, as a result, do not show the various annular grooves formed about the outer periphery of the valve sleeve 45. Such annular grooves may, however, be seen in corresponding FIGS. 4b, 5b, 6b, and 7b. It should be noted that in the overlaying views of FIGS. 4a, 5a, 6a, and 7a, dashed lines show ports and passages in the valve spool 43, while solid lines illustrate ports in the valve sleeve 45.

Formed in the outer surface of the valve sleeve 45 is a circumferential groove 81 which is in continuous fluid communication with the fluid inlet port 23 through the passage 29 and annular groove 27. Opening into the circumferential groove 81 is a plurality of main pressure ports 83 and a plurality of smaller secondary pressure ports 85, all of the pressure ports 83 and 85 being disposed generally adjacent the central reference plane RP. In the subject embodiment, a single "pressure port means" is illustrated as comprising a pair of the main pressure ports 83, for reasons which will be discussed subsequently, but it should be understood that as used hereinafter the term "pressure port means" is intended to mean and include a single port or two or more smaller ports disposed together and adjacent the central reference plane RP. In the subject embodiment, in addition to the pair of main pressure ports 83 shown in FIGS. 3 and 4a, there is another pair of ports 83 diametrically disposed from those shown, and in addition to the pair of secondary pressure ports 85 shown in FIGS. 3 and 4a, there is another pair of ports 85 diametrically disposed from those shown. The reason for the difference in size of the ports 83 and ports 85 will be described in connection with the description of the operation of the invention.

Disposed adjacent the circumferential groove 81 is an annular load sensing groove 77 into which opens a load sensing port 87 and a load sensing port 89, each of which communicates between the annular load sensing groove 77 and the interior of the valve sleeve 45. The load sensing groove 77 communicates by means of a load sensing passage (not shown in FIG. 1) defined by the controller housing 13, with a load sensing fluid port (not shown in FIG. 1, but similar to ports 23 and 25). Thus, the steering control valve 11 in the subject embodiment is of the type referred to as a "5-port" steering control valve, and typically, as is shown in FIG. 4, the load sensing fluid port communicates by means of a load signal line 88 with a load responsive device, such as the flow and pressure compensating portion of a variable displacement pump, as is now well known in the art. Therefore, the valving 41 of the present invention is capable of providing a load signal and the steering control valve 11 is preferably utilized in a load sensing mode. However, it should be understood that in the event a load signal is not desired in a particular application, it is necessary only to plug the load sensing fluid port in the housing, and the unused load sensing ports and passages do not in any way interfere with the operation of the steering control valve 11 and the valving 41.

Equally and oppositely disposed about the reference plane RP are a plurality of meter ports 91R and a plurality of meter ports 91L. The plurality of meter ports 91L is in commutating fluid communication with the plurality of meter passages 73, while the plurality of meter ports 91R is in commutating fluid communication with the plurality of meter passages 75.

Equally and oppositely disposed about the reference plane RP and further therefrom than the meter ports 91R and 91L, respectively, is a pair of circumferential grooves 93R and 93L, disposed in continuous fluid communication with the annular grooves 35 and 37, respectively. Communicating between the circumferential groove 93R and the interior of the valve sleeve 45 is a plurality of main operating ports 95R and a plurality of secondary operating ports 97R, and communicating between the circumferential groove 93L and the interior of the valve sleeve 45 is a plurality of main operating ports 95L and a plurality of secondary operating ports 97L.

Figure 2:
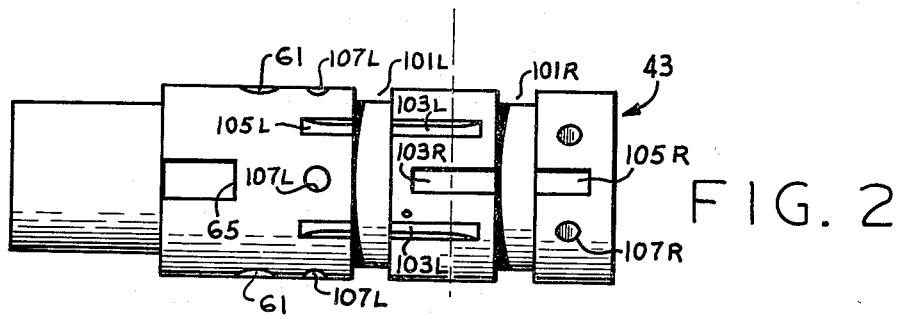
FIG. 2 is a side elevation of the primary valve member (spool) made in accordance with the present invention.
Figure 3:
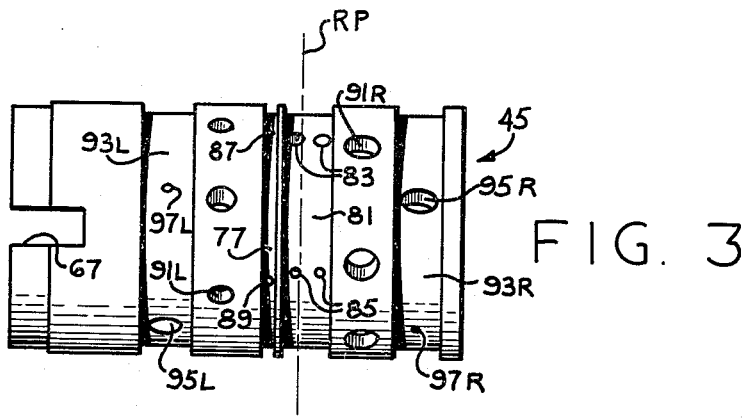
FIG. 3 is a side elevation of a follow-up valve member (sleeve) made in accordance with the present invention.
Figure 4B:
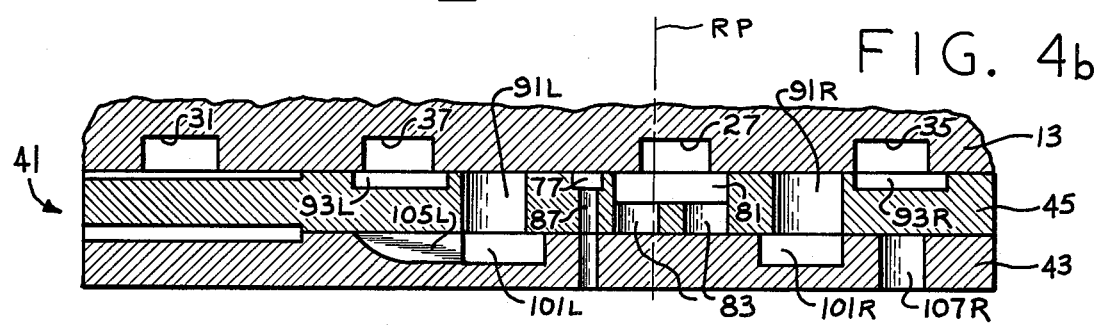
Figure 4A:
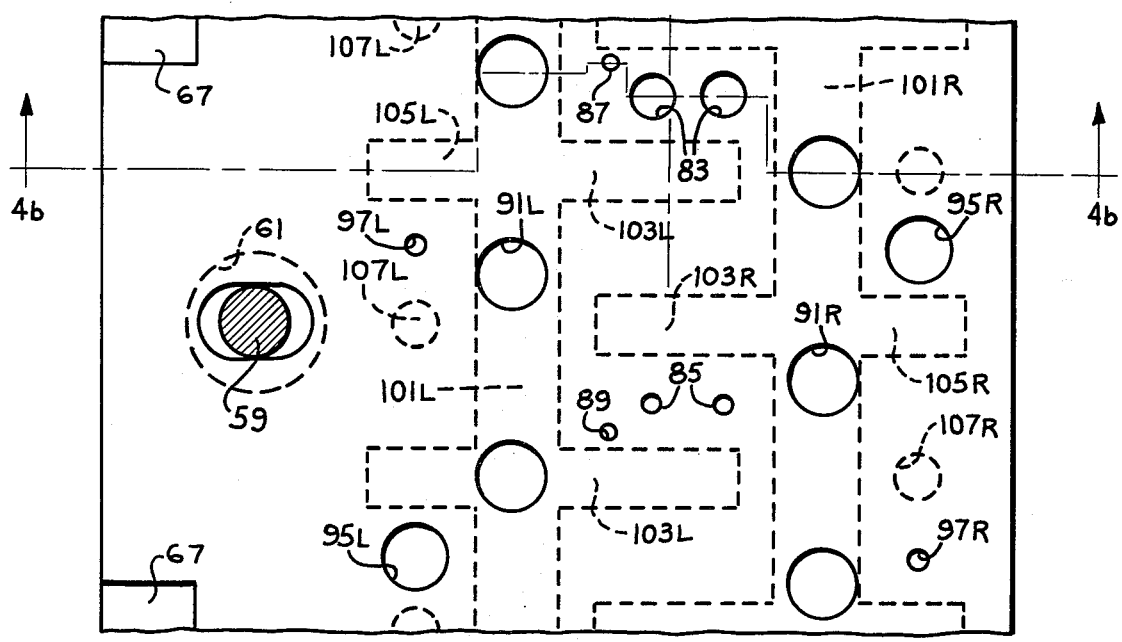
FIG. 4a is a fragmentary, overlaying view of the basic embodiment of the valve members of the present invention, in the neutral position.

Referring now to FIG. 2, in conjunction with FIG. 4a, it may be seen that the valve spool 43 defines a pair of circumferential meter grooves 101R and 101L, equally and oppositely disposed about the reference plane RP and disposed to be axially aligned with the pluralities of meter ports 91R and 91L, respectively. It should be noted that when the valve sleeve 45 is disposed about the valve spool 43, the sleeve 45 and spool 43 will be in the same axial relationship as is shown in FIGS. 2 and 3. In fluid communication with the meter groove 101R is a plurality of pressure passages 103R extending axially across the central reference plane RP. Similarly, in fluid communication with the meter groove 101L is a plurality of pressure passages 103L extending axially across the reference plane RP. In the subject embodiment, it is important that both the pressure passages 103R and 103L extend axially a sufficient distance to communicate with both of the pressure ports 83 when the valve spool 43 is rotatably displaced in the appropriate direction.

Also in fluid communication with the meter groove 101R is a plurality of operating passages 105R extending axially away from the reference plane RP a sufficient distance to communicate with the adjacent operating port 95R. Similarly, in fluid communication with the meter groove 101L is a plurality of operating passages 105L, extending axially away from the reference plane RP a sufficient distance to communicate with the adjacent operating port 95L, when the spool and sleeve are relatively displaced in the appropriate direction. It should be noted that for ease of manufacture the operating passages 105R and 105L are in circumferential alignment with the pressure passages 103R and 103L, respectively.

In addition to the above-described grooves and passages formed on the outer surface of the valve spool 43, there is a plurality of tank ports 107R, alternately disposed between operating passages 105R, and oppositely disposed therefrom about reference plane RP, a plurality of tank ports 107L, alternately disposed between operating passages 105L. Each of the tank ports 107R and 107L is disposed to be aligned with, and in fluid communication with one of the operating ports 95R and 95L, respectively, when the spool and sleeve are relatively displaced from the neutral position. The tank ports 107R and 107L are in fluid communication with the interior of the valve spool 43 so that return fluid passes through either the tank ports 107R or 107L, through the interior of the spool 43 and radially outward through the spring openings 65 and 67 into the annular groove 31 which communicates with the fluid return port 25.

OPERATION

Referring now primarily to FIGS. 4, 4a, and 4b, it may be seen that the basic embodiment of the present invention provides a steering control valve which is closed-center, and non-load-reaction. In the subject embodiment, it has a flow capacity of about 6 gpm (25 lpm). In the neutral position illustrated in FIG. 4a, it should be noted that the pressure ports 83 are circumferentially disposed about equidistantly between the pressure passages 103R and 103L, such that fluid communication between the pressure ports 83 and the pressure passage 103R will begin after a certain number of degrees of relative displacement between the spool and sleeve in one direction, while fluid communication between the pressure ports 83 and the pressure passages 103L will begin upon relative displacement of the spool and sleeve the same number of degrees in the opposite direction.

Assuming now for purposes of discussion that it is desired to make a right turn (i.e., pressurize the right chamber of steering cylinder C, moving the piston to the left in FIG. 4), the steering wheel W is rotated in a direction such that the axial passages on the valve spool 43 move upward in FIG. 4a. After several degrees of relative displacement between the valve spool 43 and valve sleeve 45, the main pressure ports 83 begin to communicate with the pressure passages 103L. It should be noted that for normal spool-sleeve displacements, the secondary pressure ports 85 do not communicate with the adjacent pressure passage 103L. The cumulative flow area defined by all of the pressure ports 83 and the adjacent pressure passages 103L are represented schematically in FIG. 4 by a variable orifice 109L, the schematic also including a corresponding variable orifice 109R for a left turn condition of the valving 41.

Pressurized fluid from fluid inlet port 23 passes through pressure ports 83 and through the individual flow areas comprising the variable orifice 109L, and into the pressure passage 103L, undergoing a pressure drop across the variable orifice 109L. It will be appreciated that in the turn condition being described, the load sensing port 89 will be in fluid communication with the adjacent pressure passage 103L, thus being able to transmit a load pressure signal from the downstream side of variable orifice 109L back through the annular load sensing grooves 77L to the load sensing fluid port (not shown) of the steering control valve 11, from where it is transmitted back to the flow and pressure compensated variable displacement pump shown in FIG. 4.

Pressurized fluid in the pressure passages 103L flows into the meter groove 101L, then through the meter ports 91L, and through the meter passages 73 to the fluid meter 17. Metered fluid flowing out of the contracting volume chambers of the fluid meter 17 returns through the appropriate meter passages 75 and through the appropriate meter ports 91R into the meter groove 101R. Metered fluid in meter groove 101R flows into the operating passages 105R, which are now in fluid communication with the main operating ports 95R. Metered fluid from the main operating ports 95R enters the circumferential groove 93R and the annular groove 35 from where it flows out the associated control fluid port (not shown) to the right end of the steering cylinder C. Fluid displaced by the movement of the piston to the left within the steering cylinder C enters through the opposite control fluid port (not shown) and flows into the annular groove 37 and circumferential groove 93L and operating ports 95L. In the turn condition described, return fluid in operating port 95L passes into the adjacent tank port 107L, from where the return fluid flows back to the reservoir as described previously.

Referring now primarily to FIGS. 5, 5a, and 5b, it may be seen that this embodiment of the present invention provides a steering control valve which is open-center, non-load-reaction and has the same 6 gpm (25 lpm) flow capacity as in the basic embodiment. In the neutral position illustrated in FIG. 5a, there is a neutral port 111 drilled through the valve spool 43 and centered between each adjacent pair of main pressure ports 83 and between each adjacent pair of secondary pressure ports 85. On either side, axially, of each of the neutral ports 111 is a counterbore 113, each of the counterbores 113 being in open fluid communication with its associated neutral port 111, and having its axis approximately coincidental with the particular pressure port 83 or 85 in communication therewith. Although the open-center portion of the present invention is not limited to the particular arrangement shown in FIGS. 5a and 5b, the arrangement shown has been found effective in minimizing the noise normally associated with open-center fluid flow wherein the fluid follows a straight radial path into the interior of the spool 43. Also, it should be noted that although the secondary pressure ports 85 do not normally communicate with adjacent pressure passages 103R or 103L, they are effective in increasing the total open-center flow area. In the open-center embodiment of FIG. 5, it should be appreciated that when the spool 43 and sleeve 45 are relatively displaced away from the neutral position to initiate fluid communication between the main pressure ports 83 and the appropriate pressure passage 103R or 103L, the open-center flow area begins to decrease, and when the relative displacement between the spool and sleeve is sufficient, the pressure ports 83 are completely out of fluid communication with the counterbores 113. As the open-center flow decreases, and eventually stops completely, the operation of the embodiment of FIGS. 5a and 5b is substantially identical to that of the basic embodiment shown in FIGS. 4a and 4b.

Referring now primarily to FIGS. 6, 6a, and 6b, it may be seen that this embodiment of the invention provides a steering control valve which is closed-center and has the same 6 gpm (25 lpm) flow capacity as the basic embodiment of FIGS. 4, 4a, and 4b, but which is load-reaction. The operation of the load-reaction embodiment of FIG. 6 is substantially the same as the non-load-reaction embodiments described previously, except in the neutral position of the spool and sleeve. In FIG. 6a, it may be seen that each of the operating passages 105R and 105L has been replaced by a wider load-reaction operating passage 121R or 121L, respectively. By comparing FIG. 6a to either FIG. 4a or FIG. 5a, it will be seen that the increase in the circumferential width of the load-reaction operating passages is just sufficient so that in the neutral position each of the operating passages 121R or 121L is in fluid communication with the adjacent operating port 95R or 95L. The resulting circuit is shown schematically in FIG. 6 wherein the opposite sides of the fluid meter 17 communicate with the opposite ends of the steering cylinder C in the neutral position of the valving 41. The concept of load reaction is generally well known in the art and as used herein will be understood to mean and include the general type of arrangement just described, whereby loads applied to the steering cylinder C will be transmitted via the fluid to the fluid meter 17. In a non-load-reaction system, the fluid between the cylinder C and the valving 41 is locked, such that the steered wheels cannot readily be turned by external forces, and the steering wheel W must be steered back to neutral. In a load-reaction system, the steered wheels are free to return to straight-ahead, moving the cylinder C, which turns the fluid meter 17 and returns the steering wheel W to neutral.

Figure 7B:
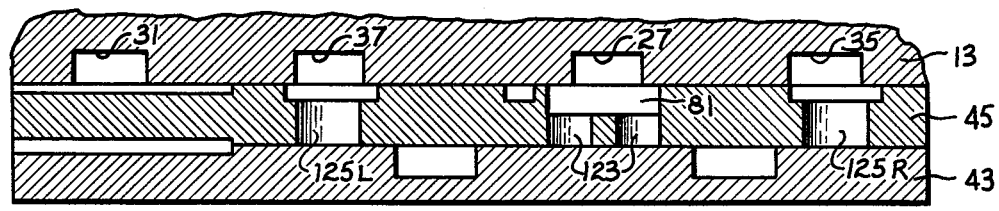
FIGS. 7a and 7b are views similar to FIGS. 4a and 4b, respectively, illustrating a higher flow capacity embodiment of the present invention.
Figure 7A:
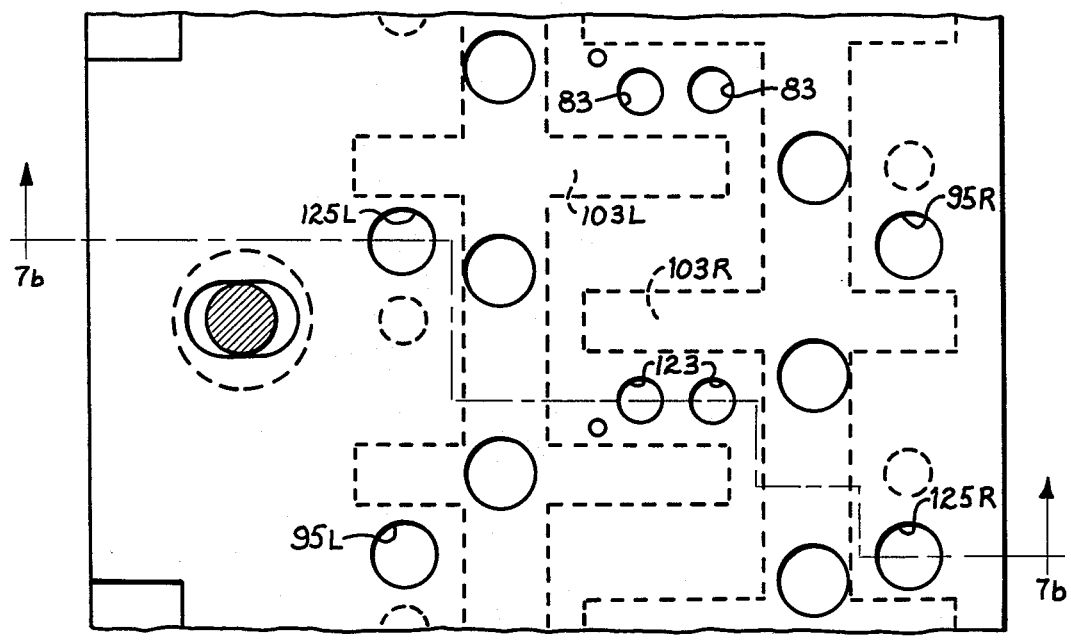

Referring now primarily to FIGS. 7a and 7b, this embodiment of the present invention provides a steering control valve which is closed-center, non-load-reaction (and therefore is schematically the same as FIG. 4), but which has a higher flow capacity than the basic embodiment shown in FIGS. 4, 4a, and 4b. In the subject embodiment, the higher flow capacity embodiment has a capacity of about 12 gpm (50 lpm), or double that of the basic embodiment. By comparing FIG. 7a with FIG. 4a, it may be seen that the higher flow capacity is accomplished by replacing each of the secondary pressure ports 85 with an additional main pressure port 123, of the same size as the main pressure ports 83. It will be appreciated by those skilled in the art that, because flow through an orifice is directly proportional to the area of the orifice, the addition of the main pressure ports 123 effectively doubles the orifice area for any particular spool and sleeve displacement, thus doubling the flow capacity. For the same reasons, each of the secondary operating ports 97R and 97L is replaced by an additional main operating port 125R and 125L, respectively. Preferably, each of the main operating ports 125R and 125L is the same size as the main operating ports 95R and 95L so that, as explained previously, the effective orifice area is doubled for any given relative displacement of the spool 43 and sleeve 45. In addition, however, making the pressure ports 123 the same as the pressure ports 83 and making the operating ports 125R and 125L the same as the operating ports 95R and 95L simplifies the manufacturing process because the same sized drill may be used for the ports 123 as for the ports 83, and the same sized drill may be used for the ports 125R and 125L as for the ports 95R and 95L.

From a review of FIGS. 4a, 5a, 6a, and 7a, it may be seen that each of the described features which may be added to the basic embodiment require modification of either the spool 43 or the sleeve 45, but never the modification of both the spool and sleeve for the addition of one particular feature or option. It will also be appreciated by those skilled in the art that in any particular spool-sleeve assembly, any or all of the added features described hereinabove may be added to the basic embodiment and in fact, the flexibility of the present design, and the ease with which various combinations of features may be added is an important advantage of the present invention.

Therefore, in accordance with the teachings of the present invention, there are four possible spool configurations:
 (a) closed-center; non-load-reaction (FIG. 4a)
 (b) open-center; non-load-reaction (FIG. 5a)
 (c) closed-center; load-reaction (FIG. 6a) and
 (d) open-center; load-reaction (FIGS. 5a and 6a)

Each of the above-identified spool configurations may be utilized with either of two sleeve configurations:
 (a) low flow capacity (FIG. 4a) or
 (b) high flow capacity (FIG. 7a)

The result is that eight different spool and sleeve combinations are possible. On a regular production basis, this may preferably be accomplished by initially machining all spools and sleeves for the closed-center, non-load-reaction, low flow capacity, basic embodiment of FIG. 4a, then performing the various optional machining steps to make the desired number of spools open-center, or load-reaction, or both, while making the desired number of sleeves with the higher flow capacity.

Figure 8B:
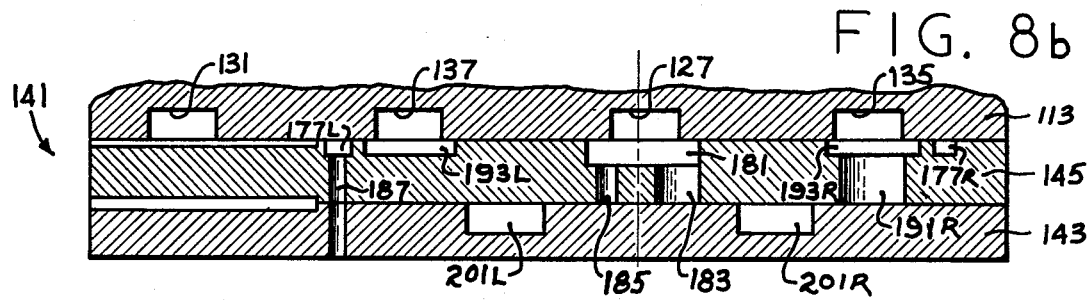
FIGS. 8a and 8b are views similar to FIGS. 4a and 4b, respectively, illustrating an alternative "basic" embodiment of the present invention.
Figure 8A:
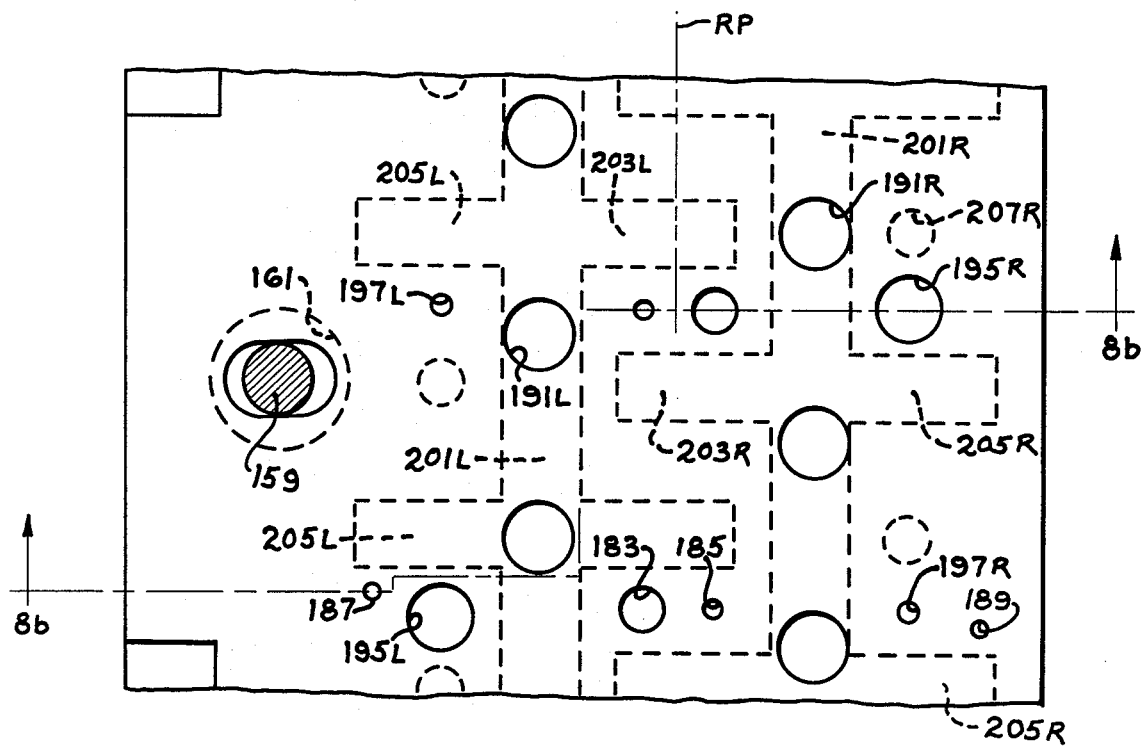

Referring now to FIGS. 8a and 8b, there is shown an alternative embodiment of the basic closed-center, non-load-reaction, low flow capacity configuration of FIGS. 4a and 4b. In the alternative embodiment, in which like elements are referred to by like numerals, plus 100, the primary change from the preferred embodiment of FIGS. 4a and 4b is the removal of the annular load sensing groove from adjacent the circumferential groove 181, and the provision of separate load sensing grooves 177R and 177L oppositely and equally disposed about the central reference plane RP.

Communicating with the load sensing groove 177L is a load sensing port 187, which is disposed to communicate with the adjacent operating passage 205L for one direction of relative displacement of the spool and sleeve. Similarly, communicating with load sensing groove 177R is a load sensing port 189, disposed to communicate with operating passage 205R for the opposite direction of relative displacement of the spool and sleeve. It may be noted by comparing FIG. 8a with FIG. 4a that the alternative embodiment would in most cases require that the operating passages 205R and 205L be axially longer than the passages 105R and 105L to provide for the necessary fluid communication with the load sensing ports 189 and 187, respectively. It should be apparent to those skilled in the art that the relocation of the load sensing ports in the alternative embodiment will affect neither the load signal provided by the valving 141, nor the operation of the steering control valve. Although not shown in detail in FIGS. 8a and 8b, it will be understood by those skilled in the art that some sort of passage must be provided by the controller housing 113 to interconnect the load sensing grooves 177R and 177L with the load sensing fluid port on the exterior of the housing 113.

The removal of the load sensing grooves and ports from the central region of the spool and sleeve makes it possible to locate the meter grooves 201R and 201L closer together, to compensate for the required increase in the axial length of operating passages 205R and 205L.

Another modification shown in the alternative embodiment of FIG. 8a is that each "pressure port means" is illustrated as comprising a main pressure port 183 and a secondary pressure port 185, with the relative position of the ports 183 and 185 being reversed from one adjacent pressure port means to the next, for better pressure balance.

It should be understood that the use of the alternative embodiment illustrated in FIG. 8a in no way affects the ability to add and combine features in the manner described in connection with the preferred embodiment. For example, each of the secondary pressure ports 185 and secondary operating ports 197R and 197L may be redrilled to the same size as the main pressure ports 183 and main operating ports 195R and 195L, respectively, to provide for higher flow capacity. Similarly, the open-center arrangement illustrated in FIG. 5a, or some other suitable arrangement, may be utilized with the alternative embodiment, and the operating passages 205R and 205L may be widened in a manner disclosed for FIG. 6a to provide a load-reaction spool.

I claim:
1. A controller for fluid pressure operated devices, said controller comprising:
 (a) a housing;
 (b) valve means disposed in said housing including a primary, rotatable valve member and a cooperating, relatively rotatable follow-up valve member, said valve members defining a neutral position relative to each other and having generally coincidental axes of rotation;
 (c) means coupling said follow-up valve member to said primary valve member for limited movement relative to said neutral position and for common rotary movement therewith;

(d) a fluid meter including a metering member movable to measure the volume of fluid which passes therethrough;

(e) means coupling said metering member to said follow-up valve member for imparting follow-up movement thereto responsive to movement of said metering member;

(f) said controller including an inlet port, an outlet port, and first and second control fluid ports for connection to a fluid pressure operated device, said primary and follow-up valve members cooperating with said housing to define a first plurality of fluid passages therein connecting said inlet port in fluid communication with said first control fluid port through said fluid meter when said valve members are relatively displaced in one direction from the neutral position and a second plurality of fluid passages therein connecting said inlet port in fluid communication with said second control fluid port through said fluid meter when said valve members are relatively displaced in the other direction from the neutral position;

(g) said first and second pluralities of fluid passages being arranged to provide substantially the same restriction to fluid flow between said inlet port and said control fluid ports in either direction of displacement of said valve members from said neutral position;

(h) said primary and follow-up valve members defining a central reference plane disposed perpendicular to said axes of rotation thereof;

(i) said first and second pluralities of fluid passages including pressure port means defined by said follow-up valve member, and first and second meter grooves and first and second axial pressure passages defined by said primary valve member, said pressure port means being disposed adjacent said reference plane, said first and second meter grooves being oppositely and approximately equally disposed about said reference plane, said first axial pressure passage communicating with said first meter groove and extending a sufficient distance to communicate with said pressure port means when said valve members are relatively displaced in said one direction, said second axial pressure passage communicating with said second meter groove and extending a sufficient distance to communicate with said pressure port means when said valve members are relatively displaced in said other direction.

2. A controller as claimed in claim 1 wherein said first and second pluralities of fluid passages include first and second fluid meter passages defined by said housing for connection to said fluid meter, said follow-up valve member defining first and second meter ports disposed to be in continuous fluid communication with said first and second meter grooves, respectively and to be in commutating fluid communication with said first and second fluid meter passages, respectively.

3. A controller as claimed in claim 1 wherein said first and second pluralities of fluid passages include first and second control fluid passages defined by said housing for communicating with said first and second control fluid ports, respectively, said follow-up valve member defining first and second operating ports disposed to be in continuous fluid communication with said first and second control fluid passages, respectively.

4. A controller as claimed in claim 3 wherein said first and second pluralities of fluid passages include first and second axial operating passages defined by said primary valve member, said first axial operating passage communicating with said first meter groove and being disposed to communicate with said first operating port when said valve members are relatively displaced in said other direction, said second axial operating passage communicating with said second meter groove and being disposed to communicate with said second operating port when said valve members are relatively displaced in said one direction.

5. A controller as claimed in claim 4 wherein said first and second axial operating passages have sufficient circumferential extent to communicate with said first and second operating ports, respectively, when said valve members are in said neutral position to provide said controller with load reaction capability.

6. A controller as claimed in claim 3 wherein said first and second operating ports are oppositely and approximately equally disposed about said central reference plane.

7. A controller as claimed in claim 3 wherein said primary valve member defines first and second tank ports communicating with said outlet ports through the interior of said primary valve member, said first tank port being disposed to communicate with said first operating port when said valve members are relatively displaced in said one direction, said second tank port being disposed to communicate with said second operating port when said valve members are relatively displaced in said other direction.

8. A controller as claimed in claim 7 wherein said primary valve member defines neutral port means communicating with the interior of said primary valve member, said neutral port means communicating with said pressure port means when said valve members are in said neutral position.

9. A controller as claimed in claim 8 wherein said neutral port means and said pressure port means cooperate to define an open-center orifice having a maximum flow area when said valve members are in said neutral position and a gradually decreasing flow area when said valve members are relatively displaced from said neutral position.

10. A controller as claimed in claim 1 wherein said primary valve member defines a plurality N of said first axial pressure passages and a plurality N of said second axial pressure passages, and said follow-up valve member defines a plurality M of said pressure port means, wherein M is equal to or greater than one and equal to or less than N.

11. A controller as claimed in claim 1 wherein said primary valve member defines a plurality N of said first axial pressure passages and a plurality N of said second axial pressure passages, N being an even integer, said follow-up valve member having, selectively, N or N/2 of said pressure port means to permit a flow through said controller, respectively, Q or Q/2 for any given relative displacement of said valve members.

12. A controller for fluid pressure operated devices, said controller comprising:

(a) a housing;

(b) valve means disposed in said housing including a primary, rotatable valve member and a cooperating, relatively rotatable follow-up valve member, said valve members defining a neutral position relative to each other and having generally coincidental axes of rotation;

(c) a fluid meter including a metering member movable to measure the volume of fluid which passes therethrough;

(d) means coupling said metering member to said follow-up valve member for imparting follow-up movement thereto responsive to movement of said metering member;

(e) said controller including an inlet port, an outlet port, and first and second control fluid ports for connection to a fluid pressure operated device, said primary and follow-up valve members cooperating with said housing to define a first plurality of fluid passages therein connecting said inlet port in fluid communication with said first control fluid port through said fluid meter when said valve members are relatively displaced in one direction from the neutral position and a second plurality of fluid passages therein connecting said inlet port in fluid communication with said second control fluid port through said fluid meter when said valve members are relatively displaced in the other direction from the neutral position;

(f) said primary and follow-up valve members defining a central reference plane disposed perpendicular to said axes of rotation thereof;

(g) said first and second pluralities of fluid passages including pressure port means defined by said follow-up valve member, and first and second meter grooves and first and second axial pressure passages defined by said primary valve member, said pressure port means being disposed adjacent said reference plane, said first and second meter grooves being oppositely and approximately equally disposed about said reference plane, said first axial pressure passage communicating with said first meter groove and extending a sufficient distance to communicate with said pressure port means when said valve members are relatively displaced in said one direction, said second axial pressure passage communicating with said second meter groove and extending a sufficient distance to communicate with said pressure port means when said valve members are relatively displaced in said other direction; and (h) said first and second pluralities of fluid passages including first and second control fluid passages defined by said housing for communicating with said first and second control fluid ports, respectively, said follow-up valve member defining first and second operating ports disposed to be in fluid communication with said first and second control fluid passages, respectively, and being operable to communicate with said first and second meter grooves, respectively, said first and second operating ports being oppositely and approximately equally disposed about said central reference plane.

13. A controller as claimed in claim 12 wherein said first and second pluralities of fluid passages include first and second axial operating passages defined by said primary valve member, said first axial operating passage communicating with said first meter groove and being disposed to communicate with said first operating port when said valve members are relatively disposed in said other direction, said second axial operating passage communicating with said second meter groove and being disposed to communicate with said second operating port when said valve members are relatively displaced in said one direction.

14. A controller as claimed in claim 12 wherein said pressure port means has a total flow area, selectively, of A or A/2 to permit a flow through said controller, respectively, of Q or Q/2 for any given relative displacement of said valve members.

15. A controller for fluid pressure operated devices, said controller comprising:

(a) a housing;

(b) valve means disposed in said housing including a primary, rotatable valve member and a cooperating, relatively rotatable follow-up valve member, said valve members defining a neutral position relative to each other and having generally coincidental axes of rotation;

(c) a fluid meter including a metering member movable to measure the volume of fluid which passes therethrough;

(d) means coupling said metering member to said follow-up valve member for imparting follow-up movement thereto responsive to movement of said metering member;

(e) said controller including an inlet port, an outlet port, and first and second control fluid ports for connection to a fluid pressure operated device, said primary and follow-up valve members cooperating with said housing to define a first plurality of fluid passages therein connecting said inlet port in fluid communication with said first control fluid port through said fluid meter when said valve members are relatively rotated in one direction from the neutral position and a second plurality of fluid passages therein connecting said inlet port in fluid communication with said second control fluid port through said fluid meter when said valve members are relatively rotated in the other direction from the neutral position;

(f) said first and second pluralities of fluid passages being arranged to provide substantially the same restriction to fluid flow between said inlet port and said control fluid ports in either direction of rotation of said valve members from said neutral position;

(g) said primary and follow-up valve members defining a central reference plane disposed perpendicular to said axes of rotation thereof;

(h) said first and second pluralities of fluid passages including pressure port means defined by said follow-up valve member, and first and second meter grooves and first and second axial pressure passages defined by said primary valve member, said pressure port means being disposed adjacent said reference plane, said first and second meter grooves being oppositely and approximately equally disposed about said reference plane, said first axial pressure passage communicating with said first meter groove and extending a sufficient distance to communicate with said pressure port means when said valve members are relatively rotated in said one direction, said second axial pressure passage communicating with said second meter groove and extending a sufficient distance to communicate with said pressure port means when said valve members are relatively rotated in said other direction.

16. Valve means for use in a controller of the type including a housing defining an inlet port, a supply passage communicating therewith, an outlet port, first and second control fluid ports and first and second control fluid passages communicating therewith, respectively, a fluid meter including a metering member movable to measure the volume of fluid passing therethrough, first and second fluid meter passages communicating with said fluid meter means, means operatively associated with said metering member to impart follow-up movement to said valve means in response to movement of said metering member, said valve means defining an axis of rotation and a central reference plane disposed perpendicular to said axis, said valve means comprising:

(a) a primary valve member defining first and second annular meter grooves and first and second axial pressure passages communicating with said first and second meter grooves, respectively;

(b) a follow-up valve member disposed about said primary valve member, defining a neutral position relative thereto and defining pressure port means adapted to communicate with said supply passage and disposed adjacent said central reference plane;

(c) said first axial pressure passage extending a sufficient distance to communicate with said pressure port means when said valve members are relatively displaced in one direction from said neutral position, said second axial pressure passage extending a sufficient distance to communicate with said pressure port means when said valve members are relatively displaced in the other direction from the neutral position;

(d) said follow-up valve member defining first and second meter ports disposed to be in continuous fluid communication with said first and second meter grooves, respectively, and adapted to be in commutating fluid communication with said first and second fluid meter passages, respectively;

(e) said follow-up valve member further defining first and second operating ports oppositely and approximately equally disposed about said central reference plane and adapted to be in continuous fluid communication with said first and second control fluid passages, respectively; and (f) said primary valve member defines a first axial operating passage communicating with said first meter groove and being disposed to communicate with said first operating port when said valve members are relatively displaced in said other direction, and a second axial operating passage communicating with said second meter groove and being disposed to communicate with said second operating port when said valve members are relatively displaced in said one direction.

17. Valve means as claimed in claim 16 wherein said primary valve member defines a plurality N of each of said first and second axial pressure passages and said follow-up valve member defines a plurality M of said pressure port means wherein M is equal to or greater than one and equal to or less than N.

18. Valve means as claimed in claim 17 wherein M is, selectively, equal to N or N/2 to permit a flow of, respectively, Q or Q/2 for any given relative displacement of said valve members.

* * * * *